(12) United States Patent
Figueria et al.

(10) Patent No.: US 9,059,798 B2
(45) Date of Patent: Jun. 16, 2015

(54) PASSIVE OPTICAL LOOPBACK

(71) Applicant: RPX Clearinghouse LLC, San Francisco, CA (US)

(72) Inventors: Norival Figueria, San Jose, CA (US);
Paul Bottorff, Palo Alto, CA (US);
Guyves Achtari, Sunnyvale, CA (US);
Huiwen Li, Sunnyvale, CA (US);
Richard Brand, Palo Alto, CA (US)

(73) Assignee: RPX Clearinghouse LLC, San Francisco, CA (US)

( * ) Notice: Subject to any disclaimer, the term of this patent is extended or adjusted under 35 U.S.C. 154(b) by 0 days.

(21) Appl. No.: 14/287,762

(22) Filed: May 27, 2014

(65) Prior Publication Data

US 2014/0270751 A1 Sep. 18, 2014

Related U.S. Application Data

(63) Continuation of application No. 10/177,998, filed on Jun. 21, 2002, now Pat. No. 8,750,702.

(51) Int. Cl.
*H04B 10/00* (2013.01)
*H04B 10/077* (2013.01)
*H04Q 11/00* (2006.01)
*G01M 11/00* (2006.01)
*H04B 10/071* (2013.01)

(52) U.S. Cl.
CPC .......... *H04B 10/0773* (2013.01); *H04B 10/00* (2013.01); *H04Q 11/0067* (2013.01); *H04Q 2011/0083* (2013.01); *G01M 11/00* (2013.01); *H04B 10/071* (2013.01)

(58) Field of Classification Search
CPC ........................................................ H04B 10/071
See application file for complete search history.

(56) References Cited

U.S. PATENT DOCUMENTS

| | | | | |
|---|---|---|---|---|
| 5,319,482 A * | 6/1994 | Tsuchiya et al. | ................ | 398/31 |
| 5,436,746 A * | 7/1995 | Hirst | ................ | 398/37 |
| 5,452,075 A * | 9/1995 | Edwall | ................ | 356/73.1 |
| 5,680,234 A * | 10/1997 | Darcie et al. | ................ | 398/9 |
| 5,790,294 A * | 8/1998 | Horiuchi et al. | ................ | 398/37 |
| 5,966,206 A * | 10/1999 | Jander | ................ | 356/73.1 |
| 6,388,741 B1 * | 5/2002 | Beller | ................ | 356/73.1 |
| 6,456,685 B1 * | 9/2002 | LaGasse | ................ | 378/65 |
| 6,708,004 B1 * | 3/2004 | Homsey | ................ | 398/177 |
| 2002/0015200 A1 * | 2/2002 | Jennings et al. | ................ | 359/124 |
| 2002/0063921 A1 * | 5/2002 | Terahara et al. | ................ | 359/124 |
| 2002/0126952 A1 * | 9/2002 | Shirai | ................ | 385/24 |
| 2002/0140927 A1 * | 10/2002 | Sobe et al. | ................ | 356/73.1 |
| 2014/0212131 A1 * | 7/2014 | Zhang | ................ | 398/16 |
| 2014/0270751 A1 * | 9/2014 | Figueria et al. | ................ | 398/16 |

* cited by examiner

*Primary Examiner* — Danny Leung
(74) *Attorney, Agent, or Firm* — Mintz Levin Cohn Ferris Glovsky and Popeo, P.C.

(57) ABSTRACT

An optical communication device comprises an input/output configured to be coupled to an optical communications line, and a passive optical loopback module coupled to the input and configured to receive optical signals from the input/output, the loopback module being further configured to reflect incoming signals of a test wavelength to the input/output.

19 Claims, 5 Drawing Sheets

PASSIVE OPTICAL LOOPBACK

CROSS-REFERENCE TO RELATED APPLICATIONS

The present application is a continuation of and claims priority to U.S. patent application Ser. No. 10/177,998, filed on Jun. 21, 2002, and incorporates its disclosure herein by reference in its entirety.

FIELD OF THE INVENTION

The invention relates to optical-component testing and more particularly to passive optical loopback tests of optical communication components.

BACKGROUND OF THE INVENTION

Loopback testing is a common technique to test a communication link prior to normal operation or to determine the source of transmission errors. Typically, a loopback test is used to test both the communication medium, e.g., optical fiber, and the physical layers of the communication devices at both ends of a link (i.e., the items connecting communication devices). Various amounts of the communication devices can be tested based upon where the loopback traffic is initiated in a sending device (i.e., the test initiating device, or initiator) and where the traffic is sent back in the receiving device (i.e., the device in which the test traffic is looped; the loopback device).

Typically, loopback testing is performed by manually initiating a tester to send a test signal to the loopback device that sends loopback traffic back to the initiating device. The initiating device receives the returned loopback traffic and compares the returned loopback traffic with the transmitted traffic to determine the working condition of the communication link and/or parts of the initiating device and/or loopback device. For such tests, the loopback device is an active device able to receive control commands to enter a loopback test mode. In loopback test mode, normal data transmission and reception is disabled. If the loopback device is nonresponsive (e.g., due to a cut fiber connection, a device failure, or a loss of power), then no loopback test can be performed to check the link between the initiating device and the loopback device. If the loopback device is an unattended remote device or is located on a customer's premises, then a technician is sent to check the loopback device and the link between the initiating and loopback devices to determine if the problem is due to a link failure, or something else. Sending a technician to diagnose problems costs money and time.

SUMMARY OF THE INVENTION

In general, in an aspect, the invention provides an optical communication device comprising an input/output configured to be coupled to an optical communications line, and a passive optical loopback module coupled to the input and configured to receive optical signals from the input/output, the loopback module being further configured to reflect incoming signals of a test wavelength to the input/output.

Implementations of the invention may include one or more of the following features. The loopback module is further configured to transfer signals, received from the input/output and having wavelengths other than a wavelength in the test wavelength range, to another portion of the communication device. The input/output is configured to be coupled to a first and a second communication line and wherein the passive loopback module is configured to receive signals from the first communication line via the input/output and to reflect incoming signals of the test wavelength to the second communication line via the input/output. The input/output is configured to be coupled to a first and a second communication line, wherein the passive loopback module is a first passive loopback module and is configured to receive first signals from the first communication line via the input/output and to reflect the first signals that are of the test wavelength to the first communication line via the input/output, and is further configured to receive second signals from the second communication line via the input/output and to reflect the second signals that are of the test wavelength to the second communication line via the input/output.

In general, in another aspect, the invention provides a method of testing an optical communication link, the link including an optical communication line and first and second connections between the communication line and first and second communication devices, respectively. The method comprises emitting an optical test signal, with a test wavelength, from an output of the first communication device to the communication link if the first connection is operational, receiving the test signal at an input of the second communication device if the communication link is operational, and passively reflecting, in the second communication device, the received test signal, as a reflected test signal, to the first communication device via the communication link if the communication link is operational.

Implementations of the invention may include one or more of the following features. The method further comprises indicating that the communication link is operational if the reflected test signal is received at the first communication device and has a power amount equal to a substantial portion of a power amount of the emitted test signal. The method further comprises receiving optical signals, including the reflected test signal, at the first communication device, and comparing indicia of at least the reflected test signal and the emitted test signal. The method further comprises comparing indicia of each signal received at the first communication device and the emitted test signal. The method further comprises indicating failure of at least a portion of the communication link otherwise.

Implementations of the invention may also include one or more of the following features. The method further comprises passing other optical signals received at the second communication device to another portion of the communication device, the other optical signals having wavelengths other than the test wavelength. The communication link is a first communication link and the method further comprises emitting the other optical signals from an output of the second communication device to a third communication device via a second communication link if the second communication link is operational, receiving the other signals at the third device if the second communication link is operational, passively reflecting, in the third communication device, a substantial portion of at least one of the received other optical signals, as another reflected test signal, to the second communication device via the second communication link if the second communication link is operational, and transferring the another reflected test signal to the first communication device if the first communication link is operational, where the at least one of the received other optical signals has another test wavelength, the another test wavelength being associated with the third communication device.

In general, in another aspect, the invention provides an optical communication system comprising a first communication device including a loopback tester configured to transmit a test signal of a test frequency to a first input/output of the first communication device, the first input/output being configured to be coupled to an optical communication line, the test signal being an optical signal, and a second communication device including a second input/output configured to be coupled to the optical communication line, the second communication device including a passive optical loopback module coupled to the second input/output and configured to inhibit signals of the test frequency from reaching other portions of the second communication device while allowing signals of other frequencies to reach another portion of the second communication device, the loopback module further configured to substantially reflect the test signal, as a reflected test signal, to the second input/output for transmission back to the first communication device, where the tester is configured to provide an indication of whether the reflected test signal is received by the first communication device.

Implementations of the invention may include one or more of the following features. The first and second communication devices are further configured to be coupled to another communication line, and wherein the loopback module is further configured to receive the test signal from the communication line and to reflect the test signal to the another communication line. The tester is configured to evaluate a characteristic of signals received by the first communication device having the test frequency with the characteristic of the transmitted test signal to determine whether the reflected test signal was received by the first communication device. The characteristic is an amount of power. The tester is configured to indicate that at least one of the communication line, a connection between the first input/output and the communication line, and a connection between the second input/output and the second communication device has failed if the tester transmits the test signal without the reflected test signal being received by the first communication device and having a substantially equal amount of power as the test signal transmitted by the tester.

Implementations of the invention may also include one or more of the following features. The communication line is a first communication line and the test frequency is a first test frequency, the system further comprising a plurality of third communication devices each having respective third inputs/outputs configured to be coupled to at least one of a plurality of second communication lines, the second communication device including an output/input configured to be coupled to the second communication lines and to pass signals having frequencies other than the first test frequency from the second input/output to the output/input of the second communication device, and wherein the third communication devices each include another passive optical loopback module configured to substantially reflect signals having respective second test frequencies to the respective third input/outputs, the respective second test frequencies being different from each other and from the first test frequency. The tester is configured to provide an indication of whether the first communication device receives a reflected signal, of a power level substantially similar to a power level of the test signal, from at least one of the loopback modules of the third communication devices, and from which third communication device such a reflected signal is received.

Various aspects of the invention may provide one or more of the following advantages. Loopback tests can be performed using low-power signals, or high-power signals, without regard to saturation concerns of communication devices. Loopback tests can be performed on passive components, or active components that have lost power or have otherwise failed. Loopback tests can be performed without interrupting normal data communications. Loopback tests can be used to verify that all components are connected properly, even if the components are not powered.

These and other advantages of the invention, along with the invention itself, will be more fully understood after a review of the following figures, detailed description, and claims.

DETAILED DESCRIPTION OF PREFERRED EMBODIMENTS

At least some embodiments of the invention provide techniques for performing loopback testing, and in particular passive optical loopback testing to determine the operating condition of optical communication links. A source device transmits an optical test signal to a receiving device. The receiving device sends the received optical signal back to the source device using a passive optical loopback module (POLM) that operates on substantially only the wavelength of the test signal (i.e., the test wavelength). The test wavelength is different from the wavelengths used for normal data communication between the source and receiving devices. For example, in a passive optical network (PON), passive loopback tests can be used between a headend device and any splitter level device or the customer premises equipment. In the case of multiple component levels, different component levels should use POLMs that act on different wavelengths. A successful passive loopback test indicates that the link between devices is operating correctly (i.e., the transmission medium is working, e.g., not cut, any intermediate connections are working, and connections between the transmission medium and the end devices are operational). Other embodiments are within the scope of the invention.

Figure 1:
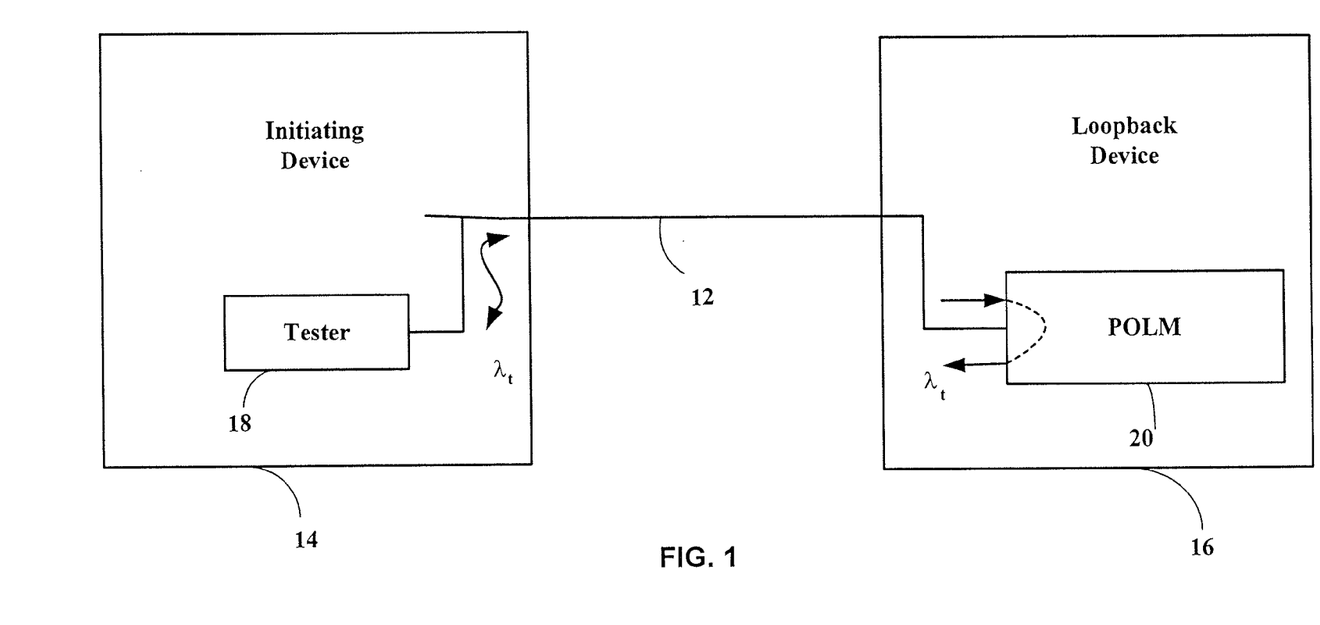
FIG. 1 is a simplified diagram of a communication system configured to perform passive loopback tests.

Referring to FIG. 1, a communication system 10 includes a communication link 12, an initiating device 14, and a loopback device 16. The device 14 is called the initiating device 14 because it includes a loopback tester 18 that initiates loopback test by sending a loopback test signal toward the loopback device 16. The device 16 is called the loopback device 16 because it includes the passive optical loopback module (POLM) 20 that provides for loopback of the loopback test signal. The initiating device 14 may be, e.g., a headend device such as a central office of a communication company, e.g., for transmitting telephone calls. The loopback device 16 may be any of various devices such as a splitter, or customer premises equipment such as a business telephone, residence telephone, or any other network communication device such as a router, switch, etc. The link 12 may be a serial link, or a wide, course, or dense wavelength division multiplexing (WWDM, CWDM, or DWDM) link. The link 12 includes an optical fiber communication line that may include intermediate connectors disposed between sections of line. The link 12 also includes connectors for connecting to inputs/outputs of the initiating and loopback devices 14, 16.

The loopback tester 18 is configured to send a loopback test signal toward the device 16. The tester 18 is configured to send a test signal of a test wavelength $\lambda_t$ that is different from wavelengths used by the devices 14, 16 for normal data communication. For example, single-mode optical fiber lines typically use wavelengths near 1310 nm (e.g., 1320, 1330) and wavelengths near 1550 nm (E.G., 1520, 1530, 1540). The tester 18 is configured to produce a test signal of a test wavelength that may be near 1310 nm or 1550 nm, but is not of a wavelength that is used for normal communication. The test wavelength may be close in wavelength to wavelengths used for normal communication as long as the test signal and normal-communication signals can be distinguished by the device 16, including the POLM 20. Preferably, if only wavelengths near 1310 nm are used for normal data communication by the devices 14, 16, then the tester 18 will produce a loopback test signal having a wavelength near 1550 nm. Likewise, if only wavelengths near 1550 nm are used for normal data communication by the devices 14, 16, then the tester 18 preferably will produce a loopback test signal having a wavelength near 1310 nm.

The tester 18 is further configured, e.g., with appropriate software run by a computer processor, to receive and analyze signals from the link 12. Preferably, the device 14 is configured to relay only received signals of the test wavelength to the tester 18, although the tester 18 may be configured to receive all signals, pass signals not of the test wavelength $\lambda_t$ to other portions of the device 14, and process signals of the test wavelength $\lambda_t$. The tester 18 can process received signals of the test wavelength $\lambda_t$ by comparing the power of the received signal with the power of the transmitted test signal. If the received signal is much lower in power than the transmitted test signal (e.g., 5 dB down, although other reference levels may be used), then the tester 18 may disregard or ignore the received signal, and not indicate that the test signal has been returned by the device 16. The 5 dB level is not required; the tester 18 is configured to determine whether a signal is the test signal being returned by the loopback device 16 and not a stray signal, or a reflection of the test signal not due to the POLM 20, e.g., due to discontinuities such as at connections.

The tester 18 is configured to determine the amount of optical loss for the link 12. The tester 18 can indicate whether the power loss is acceptable depending upon the amount of loss and the optical technology being used. Different optical technologies (e.g., the combination of transmit power, receiver stability, wavelength, etc.) can tolerate different maximum amounts of optical loss, and the tester 18 can adapt to the different tolerances of the different technologies.

The tester 18 is configured to provide an indication of whether the test signal has been returned by the loopback device 16 (at least with sufficient power to indicate an operational link). The link 12 may be considered inoperable even if the link 12 does transmit signals between the devices 14, 16, but unsatisfactorily so. The indication provided by the tester 18 may be, e.g., to actuate a "link OK" light on the device 14 and/or the device 16 if the tester 18 receives the reflected test signal with sufficient power from the POLM 20. Otherwise, the tester 18 can, e.g., actuate a "link failure" light on the device 14 and/or device 16. The tester 18 may also be separate from the device 14 such that the fiber 12 could be disconnected from the device 14 and connected to the tester 18.

The tester 18 can also indicate a quality of the link 12 in accordance with the amount of power in the signal reflected by the POLM 20. Even if the reflected signal does not contain enough power for the link 12 to be considered acceptable, the tester 18 can indicate that the link 12 is transferring signals between devices 14, 16 but with excessive/undesirable power loss. For example, the tester 18 can indicate the extent of power loss in the link 12 by indicating how much power is lost in a return trip to the device 16 (e.g., how many dB down the reflected test signal is).

Figure 2:
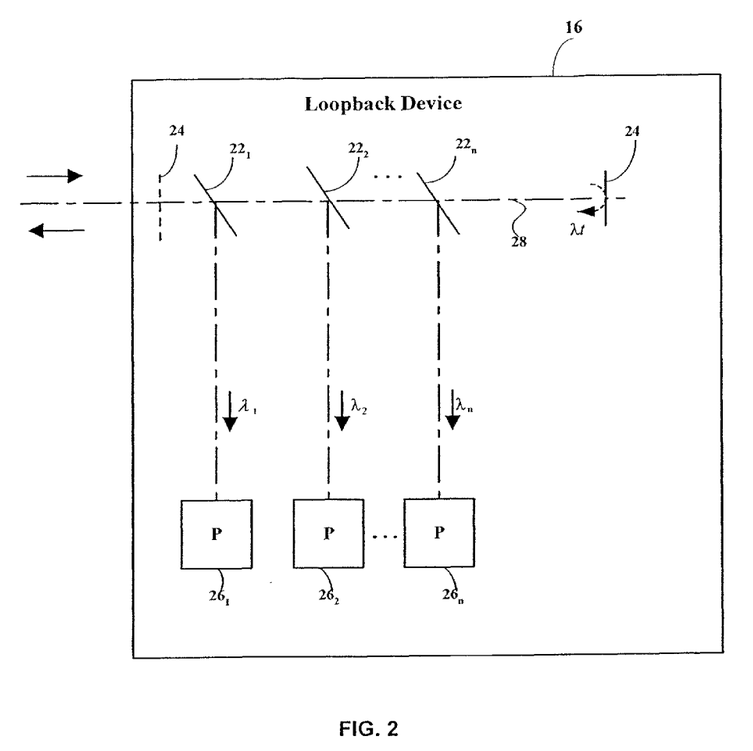
FIG. 2 is a simplified diagram of a loopback device shown in FIG. 1, including multiple frequency/wavelength-selective mirrors.

The POLM 20 of the loopback device 16 is configured to reflect or otherwise return the test signal toward the initiating device 14 via the link 12. The POLM serves as a wavelength-selective filter, passing signals of wavelengths other than the test wavelength $\lambda_t$, and reflecting signals of the test wavelength $\lambda_t$. Referring to FIG. 2, the loopback device 16 includes several wavelength-selective mirrors $22_1$-$22_n$, and a wavelength-selective mirror 24 of the POLM 20. The mirrors 22 are configured as beam splitters to pass signals of wavelengths other than selected corresponding wavelengths $\lambda_1$-$\lambda_n$, and to redirect signals of the wavelengths $\lambda_1$-$\lambda_n$ to associated processing circuits $26_1$-$26_n$. The circuits 26 are configured to process the incoming signals for normal data communication between the devices 14, 16. The mirror 24 is configured as a beam splitter to pass signals of wavelengths other than the test wavelength $\lambda_t$, and reflect signals of the test wavelength $\lambda_t$ back to the link 12. Even though the mirror is described as reflecting the signals of test wavelength $\lambda_t$, the reflection may not be perfect. The mirror 24 can be disposed as shown, downstream of the mirrors 22 to receive signals that have passed through the mirrors 22, such that the mirror 24 will not affect the quality of signals going to the circuits 26. The mirror 24, however, may be disposed further upstream in a signal path 28, such as before the mirrors 22 (as shown in phantom in FIG. 2).

Figure 3:
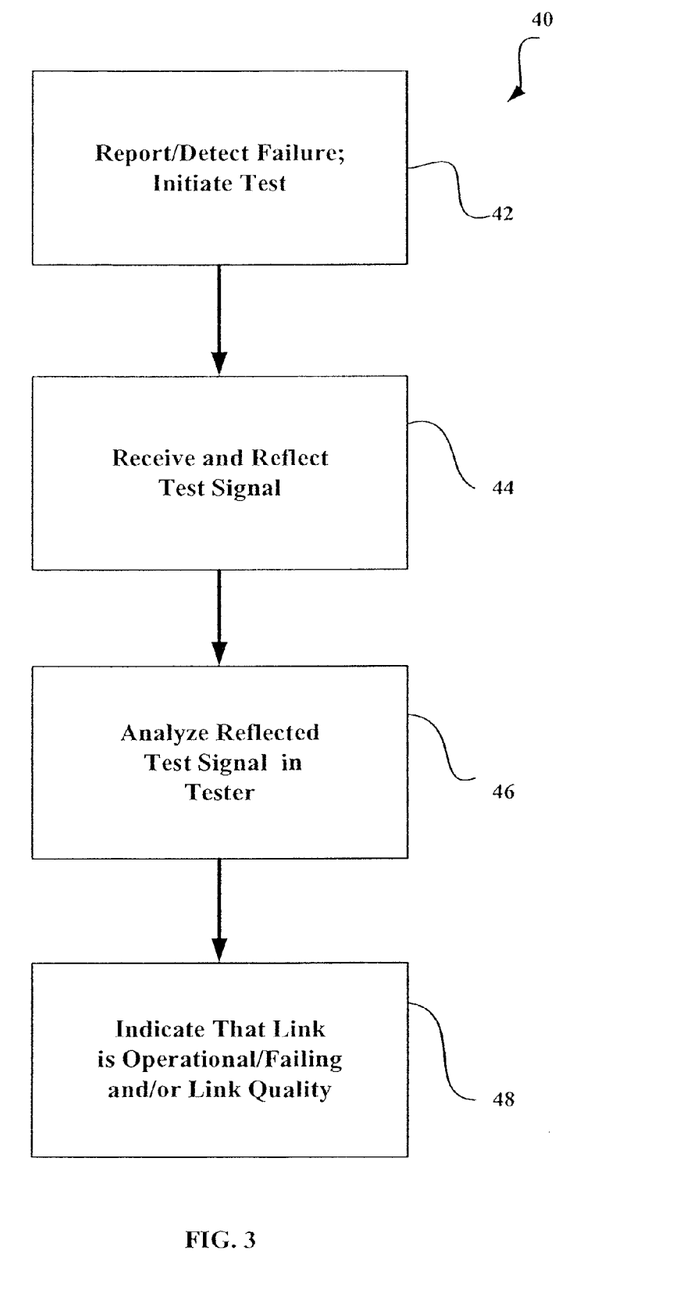
FIG. 3 is a block flow diagram of a process for performing loopback testing.

In operation, referring to FIG. 3, with further reference to FIGS. 1-2, a process 40 for performing passive optical loopback testing using the system 10 includes the stages shown. The process 40, however, is exemplary only and not limiting. The process 40 can be altered, e.g., by having stages added, removed, or rearranged.

At stage 42, a failure is detected in the system 10 and loopback testing initiated. The failure can be detected, e.g., by a user of the device 16 reporting a failure. Loopback testing is initiated by instructing the tester 18 to send a test signal toward the link 12. Test initiation may be done automatically in response to receipt by the device 14 of a failure notice. The tester 18 produces an optical test signal of wavelength $\lambda_t$ and sends the test signal to an output of the device 14 that is intended to be connected to the link 12.

At stage 44, assuming the link 12 is operational, and thus is connected to and can convey signals between the loopback device 16 and the initiating device 14, the loopback device 16 receives and reflects the test signal. The test signal enters the device 16, and proceeds to the POLM mirror 24 (either directly or by passing through one or more of the mirrors 22). At the POLM mirror 24, the test signal, having wavelength $\lambda_4$, is reflected back along the path 28 to the link 12.

At stage 46, the test signal is returned to the initiating device and is analyzed by the tester 18. The tester 18 compares the incoming signals of wavelength $\lambda_t$ to determine if the received signal is indeed the reflected test signal from the mirror 24. A power comparison of the two signals (e.g., determining how many dB down from the original, transmitted test signal the reflected test signal is) will indicate whether the received signal is a minor reflection, or the reflection from the mirror 24.

At stage 48, the tester 18 provides an appropriate indication of the result of the analysis performed in stage 46. If the power difference is slight, indicating that the received signal is the test signal reflected from the mirror 24 (with minor various losses due to, e.g., line loss, minor reflections as discussed above, and imperfect reflection by the mirror 24), the tester 18 provides an indication of such. If the test signal as reflected by the mirror 24 is not received (essentially instantaneously due to the speed of light), the tester will indicate that the link 12 has failed. The tester 18 can also indicate link quality, e.g., an amount of power in the reflected test signal relative to the transmitted test signal.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Furthermore, loopback testing can be initiated other than in response to a failure, e.g., periodically, upon initial connection/configuration of the link 12, or at any other time desired.

Figure 4:
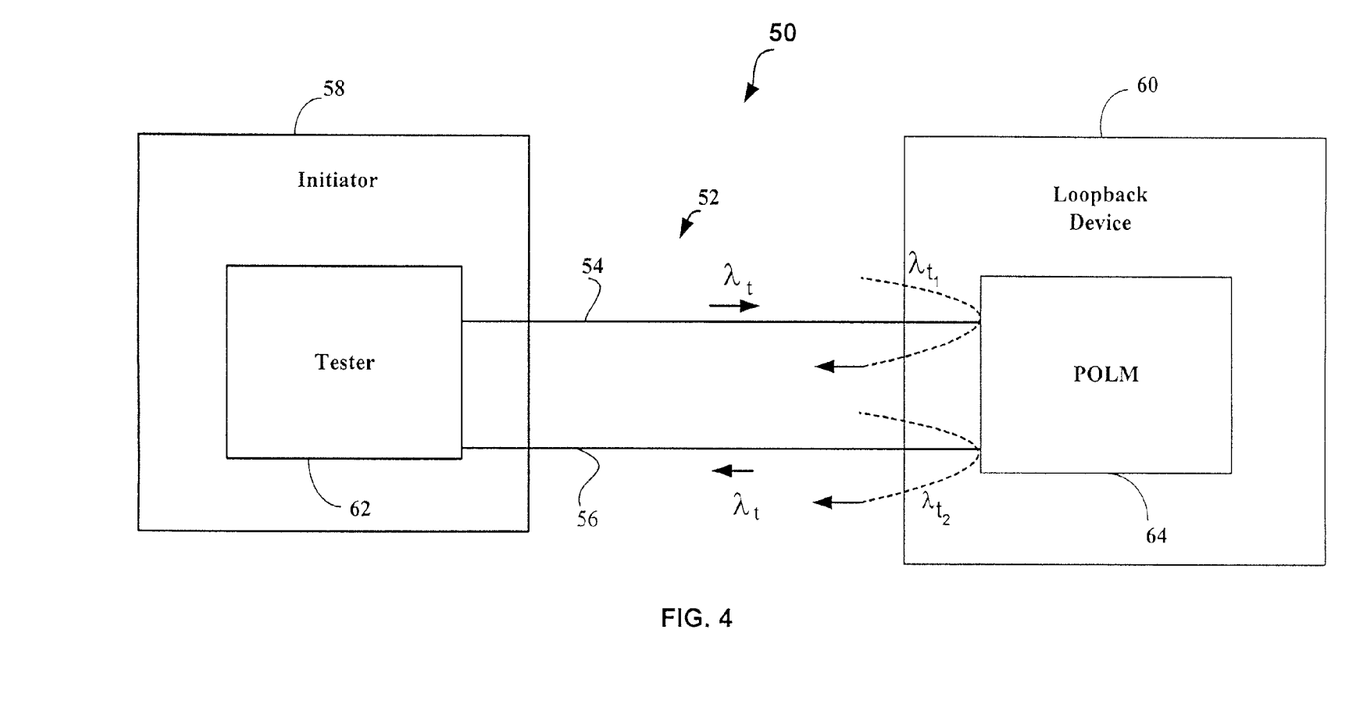
FIG. 4 is a simplified diagram of a communication system configured to perform passive loopback tests, similar to the system shown in FIG. 1.

Additionally, referring to FIG. 4, a system 50, similar to the system 10 shown in FIG. 1, includes a link 52 that has two lines 54, 56 that are used to transmit signals from an initiating device 58 to a loopback device 60, and from the device 60 to the device 58, respectively. A tester 62 of the device 58 is configured to send test signals of the test wavelength $\lambda_t$ to the device 60 via the line 54. A POLM 64 of the device 58 is configured to receive the test signal from the line 54 and to reflect the signal back to the initiating device 58 via the line 56. The tester 62 is further configured to receive reflected signals of the test wavelength $\lambda_t$ from the line 56 and to analyze the reflected signals and provide an indication of whether the link 52 is operational or has failed. Alternatively, the lines 54, 56 can be used to transmit signals bi-directionally, and the POLM 64 can be configured to reflect signals, e.g., of wavelengths $\lambda_{t1}$, $\lambda_{t2}$, received from the lines 54, 56 back to the device 58 via the same line 54, 56 from which the signals were received. The tester 62 would be configured to provide indicia of whether either, and which one, of the lines 54, 56 is operational or has failed. To send and receive the multiple test signals, the tester 62 can be configured as separate devices.

Figure 5:
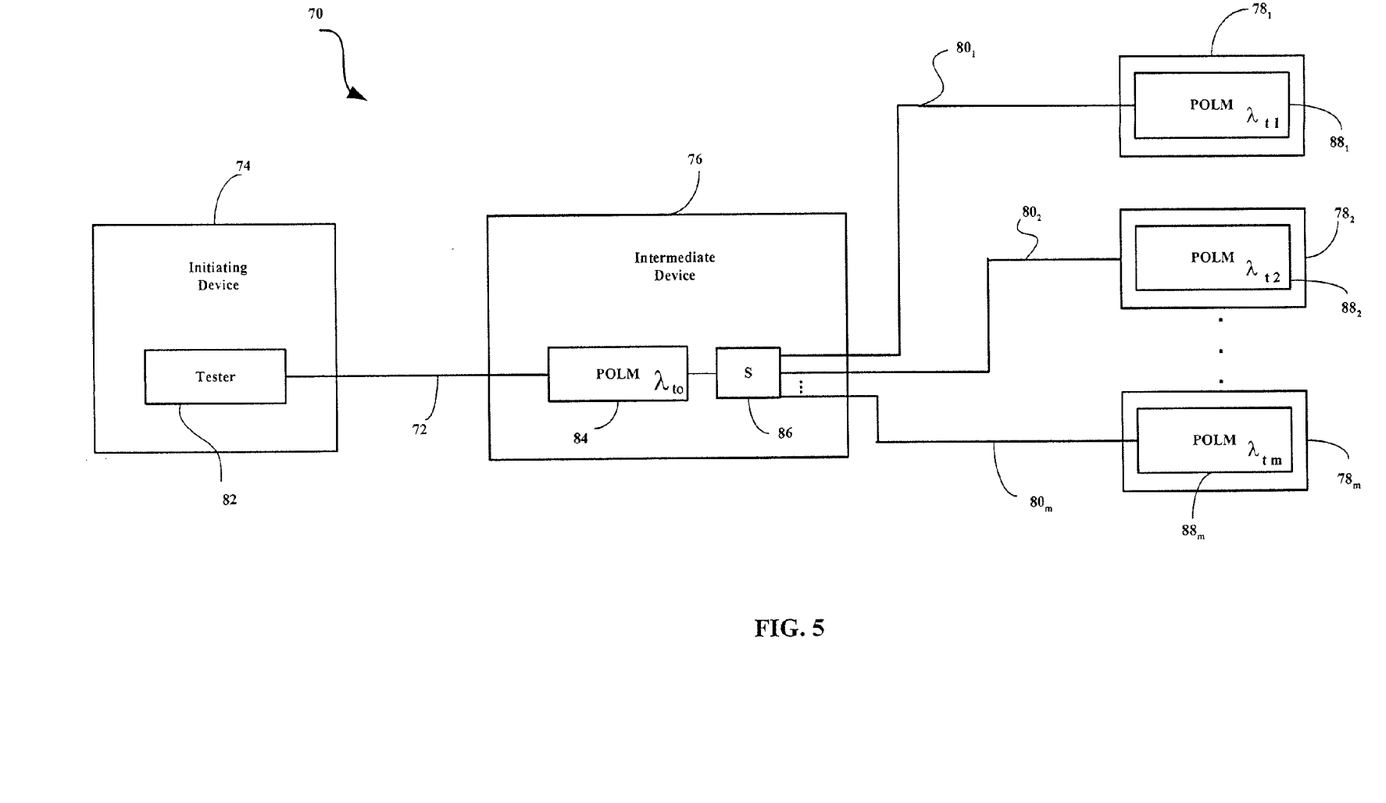
FIG. 5 is a simplified diagram of a communication system configured to perform passive loopback tests.

Referring to FIG. 5, a system 70, includes a link 72, coupling an initiating device 74 to an intermediate loopback device 76, that is further coupled to a set of further loopback devices $78_1$-$78_m$ by a set of links $80_1$-$80_m$. A tester 82 of the device 74 is configured to provide test signals of test wavelengths $\lambda_{t0}$-$\lambda_{tm}$, where all of the wavelengths $\lambda_{t0}$-$\lambda_{tm}$ are different, and can be selectively passed/reflected by appropriate wavelength-selective optical filters, such as mirrors. A POLM 84 of the device 76 is configured to reflect signals of wavelength $\lambda_{t0}$ and to pass at least signals of wavelengths $\lambda_{t1}$-$\lambda_{tm}$. A splitter 86 is configured to direct signals of wavelengths $\lambda_{t1}$-$\lambda_{tm}$ to respective corresponding links $80_1$-$80_m$. POLMs $88_1$-$88_m$ are configured to reflect signals having wavelengths of $\lambda_{t1}$-$\lambda_{tm}$, respectively. The device 76 is further configured to convey signals from the devices 78 to the device 74. The tester 82 is further configured to analyze signals of wavelengths $\lambda_{t0}$-$\lambda_{tm}$, and to provide indicia of whether the link 72 is operational or has failed if a test signal of wavelength $\lambda_{t0}$ is not returned (at least not with an acceptable amount of power). The tester 82 is also configured to provide indicia of whether any of, and which, links $80_1$-$80_m$ are operational or have failed if corresponding test signals of wavelengths $\lambda_{t1}$-$\lambda_{tm}$ are not returned with sufficient power to indicate an operational link 80. Although FIG. 5 shows more than two devices 78, two or fewer than two are possible. Furthermore, the links 72, 80 may also include multiple lines, with the tester 82 and the POLMs 84, 88 being configured accordingly.

The system 70 can be used to focus corrective action in case of system failures. For example, assuming there are 15 devices 78, if the tester 82 determines that the links 72, $80_1$, $80_3$, and $80_5$-$80_{15}$ are operational, then a technician can be instructed to focus diagnostic efforts on the links $80_2$ and $80_4$. If the device 74 is a headend communication station, the device 76 is a splitter, and the devices 78 are home business telephones (or any other network communication devices such as routers, switches, etc.) distributed in different locations, then the technician can save time and money by only traveling to the locations of the devices $78_2$, $78_4$ associated with the failing links $80_2$, $80_4$.

What is claimed is:

1. An optical network comprising:
   an optical transmitter;
   an optical distribution unit which is optically coupled to the optical transmitter and which comprises a first optical loopback device configured to loop back towards the optical transmitter an optical signal at a first optical test wavelength; and
   an optical receiver which is optically coupled to the optical transmitter via the optical distribution device and which comprises a second optical loopback device configured to loop back towards the optical transmitter via the optical distribution unit an optical signal at a second optical test wavelength.

2. The optical network of claim 1, comprising a plurality of optical receivers which are optically coupled to the optical distribution unit, each optical receiver comprising a respective optical loopback device configured to loop back towards the optical transmitter via the optical distribution unit a respective optical signal at a respective test wavelength.

3. The optical network of claim 2, wherein the optical distribution unit comprises an optical element configured to split an optical data signal transmitted by the optical transmitter into component data signals for distribution to the plurality of optical receivers and configured to combine optical signals looped back from the plurality of optical loopback devices for coupling to the optical transmitter.

4. The optical network of claim 3, wherein the optical element is wavelength selective and is configured to direct at least one component data signal having a respective wavelength to each respective optical receiver of the plurality of optical receivers.

5. The optical network of claim 4, wherein the optical element is configured to direct a respective optical test signal having a respective wavelength to each respective optical receiver of the plurality of optical receivers for looping back of the respective test signals by the respective optical receivers.

6. The optical network of claim 1, wherein the first optical loopback device is configured to passively reflect the optical signal at the first test wavelength to loop the optical signal at the first test wavelength back towards the optical transmitter.

7. The optical network of claim 6, wherein the first optical loopback device is configured to pass optical signals at other wavelengths while passively reflecting the optical signal at the first test wavelength.

8. The optical network of claim 1, wherein the second optical loopback device is configured to passively reflect the optical signal at the second test wavelength to loop the optical signal at the first test wavelength back towards the optical transmitter.

9. The optical network of claim 8, wherein the second optical loopback device is configured to pass optical signals at other wavelengths while passively reflecting the optical signal at the second test wavelength.

10. The optical network of claim 2, wherein the each optical loopback device is configured to passively reflect the optical signal at the respective test wavelength to loop the optical signal at the respective test wavelength back towards the optical transmitter.

11. The optical network of claim 10, wherein each optical loopback device is configured to pass optical signals at other wavelengths while passively reflecting the optical signal at the respective test wavelength.

12. The optical network of claim 1, wherein:
the optical network is a passive optical network (PON) comprising an optical head end, an optical network unit (ONU) and a plurality of customer premises units;
the optical head end comprises the optical transmitter;
the ONU comprises the optical distribution unit; and
each customer premises unit comprises a respective optical receiver of the plurality of optical receivers.

13. The optical network of claim 12, comprising an optical fiber link between the optical head end and the ONU.

14. The optical network of claim 13, wherein the optical fiber link between the head end and the ONU is wavelength division multiplexed.

15. The optical network of claim 12, comprising a respective optical fiber link between the ONU and each respective customer premises unit.

16. The optical network of claim 1, wherein the optical transmitter comprises a test receiver configured:
to receive the looped back optical signal at the first test wavelength;
to analyze to the looped back optical signal at the first test wavelength to assess optical connectivity between the optical transmitter and the optical distribution unit;
to receive the looped back optical signal at the second test wavelength; and
to analyze to the looped back optical signal at the second test wavelength to assess optical connectivity between the optical transmitter and the optical receiver.

17. The optical network of claim 16, wherein the test receiver is configured to distinguish faults between the optical transmitter and the optical distribution unit from faults between the optical distribution unit and the optical receiver based on analysis of the looped back signals at the first and second test wavelengths.

18. The optical network of claim 2, wherein the test receiver is configured:
to receive the looped back optical signal at each respective test wavelength; and
to separately analyze the looped back optical signals at each respective test wavelength to assess optical connectivity between the optical transmitter and each respective optical receiver of the plurality of optical receivers.

19. The optical network of claim 18, wherein the test receiver is configured to assess fault locations based on analysis of the looped back optical signals at the respective test wavelengths.

* * * * *